United States Patent
Prenger et al.

Patent Number: 5,667,269
Date of Patent: Sep. 16, 1997

[54] THREE SECTION CONVERTIBLE TOP

[75] Inventors: Rainer Prenger, Osnabrueck; Uwe Nissen, Steinhagen, both of Germany

[73] Assignee: Wilhelm Karmann GmbH, Osnabrueck, Germany

[21] Appl. No.: 625,927

[22] Filed: Apr. 1, 1996

Related U.S. Application Data

[63] Continuation of Ser. No. 321,705, Oct. 12, 1994, abandoned.

[30] Foreign Application Priority Data

Oct. 15, 1993 [DE] Germany .................. 93 15 758.4 U

[51] Int. Cl.$^6$ ........................................................ B60J 7/12
[52] U.S. Cl. .................................. 296/107; 296/108
[58] Field of Search ............................. 296/107, 108, 296/116, 121

[56] References Cited

U.S. PATENT DOCUMENTS

| | | | |
|---|---|---|---|
| 1,952,252 | 3/1934 | Heuser | 296/107 |
| 2,596,309 | 5/1952 | Urich | 296/107 |
| 3,473,842 | 10/1969 | Bracey et al. | 296/116 |
| 3,994,524 | 11/1976 | Lehmann | 296/107 |
| 4,261,615 | 4/1981 | Deaver | 296/210 |
| 4,440,436 | 4/1984 | Giddens et al. | 296/107 |
| 4,747,635 | 5/1988 | Wagner | 296/107 |
| 4,991,902 | 2/1991 | Schrader et al. | 296/107 |
| 5,207,474 | 5/1993 | Licher et al. | 296/116 X |

FOREIGN PATENT DOCUMENTS 740339  8/1966  Canada ..................... 296/107

*Primary Examiner*—David M. Mitchell
*Assistant Examiner*—Kia M. Robinson
*Attorney, Agent, or Firm*—Jordan and Hamburg

[57] ABSTRACT

A top for convertibles includes a frame, the side parts of which are disposed symmetrically to the longitudinal axis of the vehicle and comprise front and rear pieces which are pivotably braced over a main column and a main guide rod at a rear main bearing of the chassis frame. The roof peak of the frame lies in a closed position against an upper cross-tie of a windshield frame. The frame is constructed in the front region as a one-piece, shaped carrying part with a U-shaped contour at the basic cross-member of which, forming the roof peak, the front frame parts, which have at their free ends at least one joint connecting element directed towards the main column, are integrally molded over a respective connecting zone as profiled legs.

31 Claims, 3 Drawing Sheets

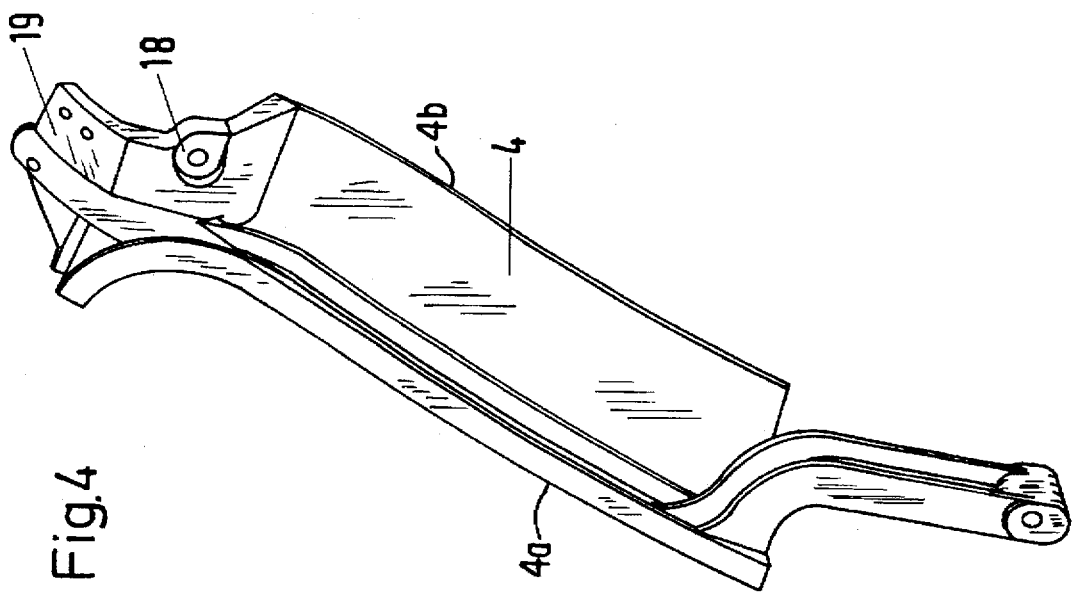
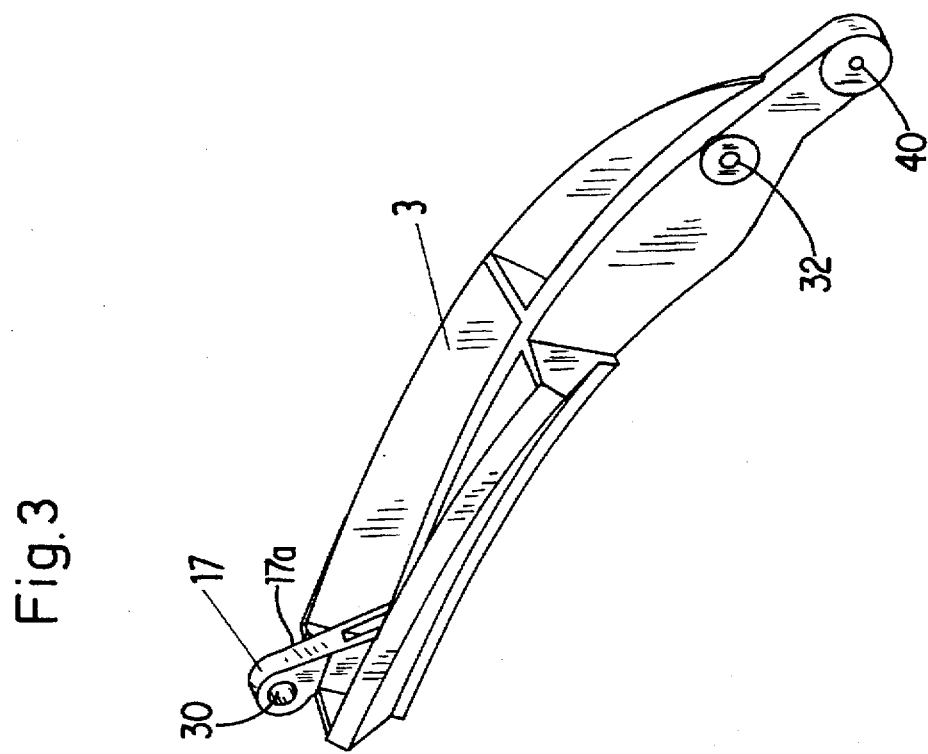

THREE SECTION CONVERTIBLE TOP

This application is a continuation of application Ser. No. 08/321,705 filed Oct. 12, 1994, which has been abandoned.

BACKGROUND OF THE INVENTION

The invention relates to a top for convertibles.

For known convertibles, the frame for the top consists of a welded construction of steel. The assembly, comprising the peak of the roof and the front part of the roof frame, consists here of six parts, the assembly comprising the rear part of the roof frame includes four components and the main column assembly is composed of six parts. In addition, receptacles for the locking devices for the top are constructed separately.

SUMMARY OF THE INVENTION

It is an object of the invention to provide a top which is distinguished by a significantly lower number of components for the frame and by a lesser weight which makes the handling easier.

The inventive construction overall makes possible a significant reduction in the number of components comprising the frame for the top and also in the weight. Expensive welding work is no longer required to assemble the frame. As a result, the quality of the frame for the top can be improved overall, since there no longer is a need for manufacturing tolerances which are unavoidable for welding. Moreover, due to the omission of the labor-intensive welding, the top can be produced more inexpensively. Furthermore, the tying to the remaining components of the frame for the top can be configured more simply.

Further details and advantages of the invention arise out of the following specification and out of the drawing, which diagrammatically illustrates an embodiment of the object of the invention.

BRIEF DESCRIPTION OF THE DRAWINGS

FIG. 3 shows an enlarged, perspective representation of a second component of the frame of FIG. 1; and FIG. 4 shows an enlarged, perspective representation of a third component of the frame of FIG. 1.

DESCRIPTION OF THE PREFERRED EMBODIMENTS

Figure 1:
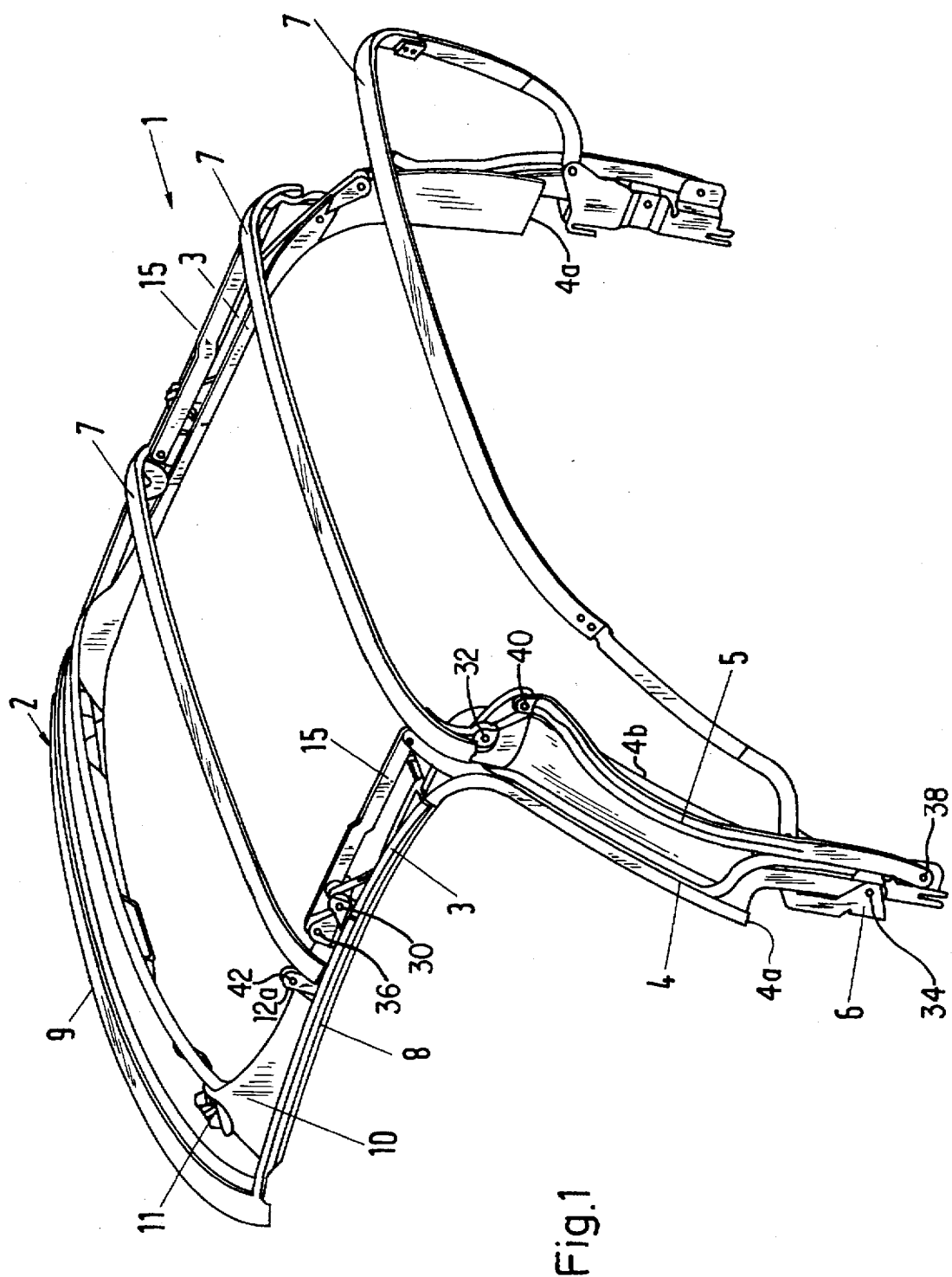
FIG. 1 shows a perspective, overall view of the inventive frame for the top.

The frame 1 for the top, generally labeled 1 in FIG. 1, consists of a front supporting part 2, two rear roof frame parts 3, two main columns 4, two guide rods 5 and two main bearings 6, which serve for retaining as well for fastening the rod assembly elements of the top and in each case are firmly connected to the body. In addition, roof arches 7 are provided for fastening the material of the top in the usual manner.

Figure 2:
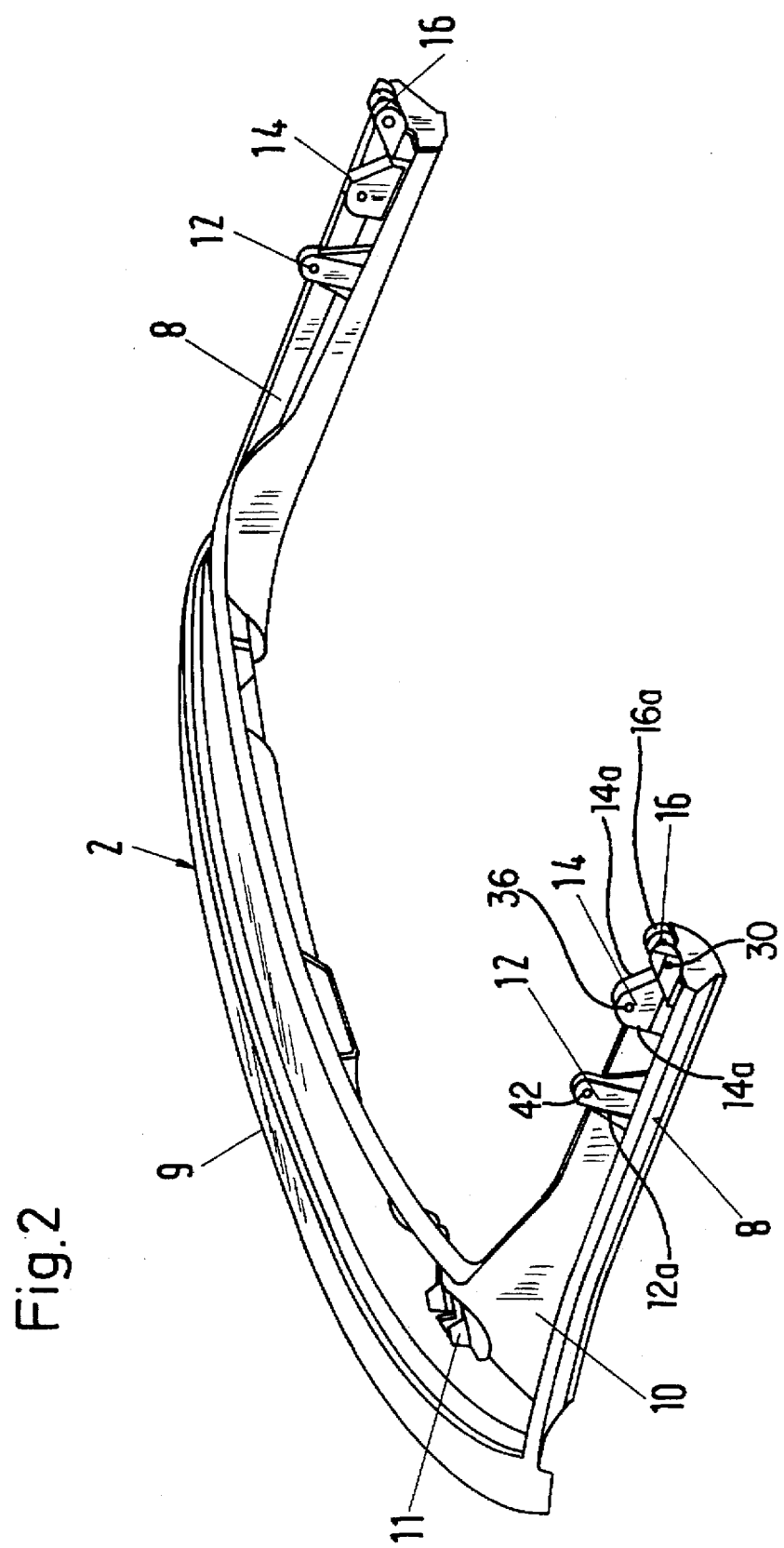
FIG. 2 shows an enlarged, perspective representation of a first component of the frame of FIG. 1.

Furthermore, as can be seen particularly from FIG. 2, the supporting part 2 is U-shaped and constructed as a one-piece molded part, preferably of pressure diecasting (such as aluminum pressure diecasting). The peak of the roof 9, which lies against the upper transverse cross-tie of a windshield of the vehicle, forms the basic cross-member.

Adjoining each side of the peak 9 of the roof, there is a front roof frame part 8. Between the peak 9 of the roof and the front roof frame parts 8, there is in each case a connecting zone 10, which has a receptacle 11 for the locking device for the top.

In the region of the free ends of the front roof frame parts 8, there are connecting elements to the remaining components of the frame 1 for the top. For example, a receiving fulcrum 12, which pivotably holds at 42 a connecting element 25, which in turn is connected with the roof arch 7, is provided here. As shown in FIG. 1, the roof arch 7 is stretched in this region over the two front roof frame parts 8. In addition, the free ends of the front roof frame parts 8 have receiving fulcrums 14 for pivotably connecting at 36 a roof peak guide rod 15. Moreover, elements 16 for a mechanical joint connection with the opening rear roof frame part 3 are disposed here.

The rear roof frame part 3, in each case adjoining the front roof frame parts 8 can be seen in FIG. 3. This rear roof frame part 3 advantageously is also constructed as a one-piece molded part and consists advisably, just as does the supporting part 2, of aluminum pressure diecasting. The region of the rear roof frame part 3, facing the front roof frame part 8, has a connecting element 17, which corresponds to the connecting element 16. By these means, the two roof frame parts 8, 3 can pivotably be connected at 30 to one another mechanically (for example, by means of pivot shafts). The region of the rear roof frame part 3, facing the main column 4, has a receiving fulcrum 3a, at which the main column 4 is pivotably connected at 32 with the roof frame part 3. Moreover, a receiving fulcrum 3b is provided, at which the main guide rod 5 is pivotably connected at 40 with the roof frame part 3.

This main column 4, which can be connected with the rear roof frame parts 3, can be seen in FIG. 4. This main column 4 is also advantageously constructed as a one-piece molded part of pressure diecast aluminum. The main column 4 has the connecting elements 18 for mechanically fastening to the rear roof frame part 3, as well as receptacles 19 for the roof arch 7 in the middle, which is connected with the main column 4 over a fixed connection, for example, a screwed connection. In addition, the roof peak guide rod 15 is pivotably connected at 21 with the main column 4.

As shown in FIG. 2, the connecting element 16, the receiving fulcrum 14, and the receiving fulcrum 12 are in the form of projections 16a, 14a, 12a respectively which project upwardly from the front roof frame part 8. Also as shown in FIG. 2 each projection 16a, 14a and 12a has an outer end portion at which the pivotal connections 30, 36 and 42 respectively are made. As shown in FIG. 3, the connecting element 17 is in the form of a projection 17a which projects upwardly from the side member 3. Also as shown in FIG. 3 the projection 17a has an outer end portion at which the pivotal connection 30 is made.

As is evident from FIG. 1, the main column 4 is pivotably fastened at 34 to the main bearing 6 at receiving fulcrum 22 and the main guide rod 5 is pivotally fastened at 38 to the receiving fulcrum 23. Moreover, the main bearing 6 is pivotably mounted at the receiving fulcrum 24 of the rear roof arch 7. As shown in FIGS. 1 and 4, the main columns 4 have two parts 4a and 4b with the part 4b extending laterally from part 4a.

The pivot connections and pivot fastenings 21, 30, 32, 34, 36, 40, and 42 each constitute pivot means.

As is evident from the preceding, the number of components, of which the inventive frame for the top is composed, can be reduced considerably and the assembly of the individual elements to form the frame for the top can be simplified significantly. The manufacturing tolerances, improved by these means, increase the quality of the top as a whole and improve the possibilities for fastening mounting parts for the top, such as clamping and framing rails. The fact that the main components are produced from pressure diecast aluminum primarily means a reduction in weight. This facilitates the handling of the top and also improves the recycling possibilities. Moreover, particularly because the supporting part is made from a pressure diecast material, new design ideas can be realized in that, for example, the supporting part 2 is designed in such a way that it serves to cover the remaining parts of the rod assembly and the material of the top, when the top is down. This may also be of advantage from an aesthetic as well as from a safety point of view.

Aside from pressure diecast aluminum, other lightweight materials, such as magnesium alloys or composites (plastics or fiberglass-reinforced plastics) can also be used to make the components of the top, since their properties, with respect to weight and strength, are similar to those of pressure diecast aluminum.

What we claim is:

1. A top for a convertible vehicle having a front, a rear and a longitudinal axis extending from front to rear, said top comprising a molded one-piece U-shaped frame member having a front section extending transversely of said longitudinal axis and two elongated spaced side sections extending rearwardly from said front section, each of said side sections having a first connecting element, said first connecting element being integrally formed with said molded one-piece U-shaped frame member, a pair of side members, first pivot means pivotably connecting said side members to said first connecting element of said elongated side sections of said one-piece U-shaped frame member for pivotal movement about a generally horizontal axis, a pair of main column means, said pair of main column means having second pivot means pivotably mounting said pair of main column means on said vehicle, and third pivot means pivotably connecting said side members to said main column means for pivotal movement about a generally horizontal axis, said two spaced elongated side sections, said pair of side members, and said pair of main column means each being disposed on opposite sides of said longitudinal axis of said vehicle.

2. A top for a convertible vehicle according to claim 1 wherein each of said main column means comprises a main bearing support and a main column member, said second pivot means pivotably supporting said main column member on said main bearing support.

3. A top for a convertible vehicle according to claim 2 wherein each of said side sections has a first receiving fulcrum integrally formed with said molded one-piece U-shaped frame member, and further comprising elongated guide rods juxtaposed to said side members, fourth pivot means pivotably connecting said guide rods to said first receiving fulcrum on each of said elongated side sections of said one-piece U-shaped member and fifth pivot means pivotably connecting said guide rods to said main column members.

4. A top for a convertible vehicle according to claim 3 wherein said elongated guide rods are designated first guide rods, further comprising elongated second guide rods juxtaposed to said main column members, sixth pivot means pivotably connecting said elongated second guide rods to said side members, and seventh pivot means pivotably connecting said elongated second guide rods to said main bearing support.

5. A top for a convertible vehicle having a front, a rear and a longitudinal axis extending from front to rear, said top comprising a molded one-piece U-shaped frame member having a front section extending transversely of said longitudinal axis and two elongated spaced side sections extending rearwardly from said front section, each of said side sections having a first connecting element, said first connecting element being integrally formed with said molded one-piece U-shaped frame member, a pair of side members, first pivot means pivotably connecting said side members to said first connecting element of said elongate side sections of said one-piece U-shaped frame member for pivotal movement about a first axis, a pair of main column means, said pair of main column means having second pivot means pivotably mounting said pair of main column means on said vehicle for pivotal movement about a second axis, and third pivot means for pivotably connecting said side members to said main column means for pivotal movement about a third axis, said first, second and third axes being substantially parallel to one another, said two spaced elongated side sections, said pair of side members, and said pair of main column means each being disposed on opposite sides of said longitudinal axis of said vehicle.

6. In a top for a convertible vehicle having a front, a rear and a longitudinal axis extending from front to rear, the combination comprising:

a molded, one-piece, U-shaped frame member lying against an upper transverse cross-tie of a windshield of the vehicle and directly connected to a roof arch, said frame member having a front section extending transversely of said longitudinal axis and two elongated spaced side sections extending rearwardly from said front section;

each of said side sections having a first connecting element;

a pair of side members; and first pivot means pivotally connecting said first connecting element to said side members.

7. In a top for a convertible vehicle according to claim 6 wherein said first connecting element on said side sections of said molded one-piece U-shaped frame member comprises a projection projecting upwardly from said elongated side section, said elongated side section and said projection being integral with said molded one-piece U-shaped frame member, said projection having an outer end portion, said first pivot means being located at said outer end portion of said projection.

8. In a top for a convertible vehicle according to claim 6 wherein each of said side sections has a first receiving fulcrum integrally formed with said molded one-piece U-shaped frame member, said first receiving fulcrum comprising a projection projecting upwardly from said side sections, said projections being integral with said side sections of said molded one-piece U-shaped frame member.

9. In a top for a convertible vehicle according to claim 6 wherein said first connecting element on each of said side sections comprises a first projection projecting upwardly from said elongated side sections, said first projection being an integral part of said molded one-piece U-shaped supporting member, said first projection having a first outer end portion, said first pivot means being located at said first outer end portion of said first projection, each of said side sections having a first receiving fulcrum integrally formed with said molded one-piece U-shaped frame member, said first receiving fulcrum comprising a second projection projecting upwardly from said elongated side sections, said elongated side section and said second projection each being integral parts of said molded one-piece U-shaped frame member, said second projection having a second outer end portion, and second pivot means being located on said second outer end portion of said second projection.

10. A top for a convertible vehicle according to claim 6 wherein said molded one-piece U-shaped frame member is molded from a material selected from the group consisting of diecast aluminum, magnesium alloy, fiber-reinforced plastic, and plastic.

11. In a top for a convertible vehicle according to claim 9 wherein said molded one-piece U-shaped frame member including said first connecting element and said first receiving fulcrum are all molded from a material selected from the group consisting of diecast aluminum, magnesium alloy, fiber-reinforced plastic, and plastic.

12. In a top for a convertible vehicle according to claim 9 further comprising a second receiving fulcrum on each of said side sections of said molded one-piece U-shaped frame member, said second receiving fulcrum including a third projection projecting upwardly from said elongated side section, said elongated side section and said third projection being integral parts of said molded one-piece U-shaped frame member, said third projection having a third outer end portion, third pivot means located at said third outer end portion, and said roof arch pivotally connected to said third pivot means.

13. In a top for a convertible vehicle according to claim 12 wherein said molded one-piece U-shaped frame member including said first connecting element, said first receiving fulcrum and said second receiving fulcrum are all molded from a material selected from the group consisting of diecast aluminum, magnesium alloy, fiber-reinforced plastic, and plastic.

14. In a top for a convertible vehicle according to claim 6 wherein said vehicle has a locking device for locking said top to said vehicle, said molded one-piece U-shaped frame member having a receptacle for receiving said locking device.

15. In a top for a convertible automobile according to claim 9 further comprising:
a main bearing support mounted on said vehicle;
third pivot means pivotally connecting main columns to said main bearing support;
a first guide rod;
said first guide rod being pivotably connected to said one-piece U-shaped frame member at said second pivot means on said second outer end portion of said second projection of said one-piece U-shaped frame member; and
fourth pivot means pivotally connecting said first guide rod to said main columns.

16. In a top for a convertible vehicle according to claim 15 further comprising:
a second guide rod;
fifth pivot means pivotally connecting said second guide rod to said main bearing support; and
sixth pivot means pivotally connecting said second guide rod to said side member.

17. A top for a convertible vehicle having a front, a rear and a longitudinal axis extending from front to rear, said top comprising:
a molded, one-piece, U-shaped frame member having a front section extending transversely of said longitudinal axis and two elongated spaced side sections extending rearwardly from said front section;
each of said side sections having a first receiving fulcrum and a first connecting element;
a pair of molded one-piece side members;
each of said side members having a second receiving fulcrum and a second connecting element;
first pivot means pivotally connecting said first connecting element and said second connecting element to thereby pivotally connect said side sections of said molded one-piece U-shaped frame member to said molded one-piece side member;
a pair of molded one-piece main columns;
second pivot means pivotally connecting said molded one-piece main columns and said second receiving fulcrum to thereby pivotably connect said molded one-piece main column to said molded one-piece side member;
a main bearing support mounted on said vehicle;
third pivot means pivotally connecting said molded one-piece main columns to said main bearing support;
a first guide rod;
fourth pivot means pivotally connecting said first guide rod to said one-piece U-shaped frame member;
fifth pivot means pivotally connecting said first guide rod to said molded one-piece main columns;
a second guide rod;
sixth pivot means pivotally connecting said second guide rod to said main bearing support; and
seventh pivot means pivotally connecting said second guide rod to said molded one-piece side member.

18. A top for a convertible vehicle according to claim 17 wherein said second connecting element on said side members comprise a projection projecting upwardly from said side members, said side members and said projection each being an integral part of said molded one-piece side member, said projection having an outer end portion, said first pivot means being located at said outer end portion of said projection.

19. A top for a convertible vehicle according to claim 16 wherein said molded one-piece main columns each have an elongate first part and a second part extending laterally from said first part, said first part and said second part being integral parts of said molded one-piece main columns.

20. A top for a convertible vehicle according to claim 16 wherein each of said molded one-piece U-shaped frame member, said molded one-piece side members and said molded one-piece main columns are molded from a material selected from the group consisting of diecast aluminum, magnesium alloy, fiber-reinforced plastic and plastic.

21. A top for a convertible vehicle having a front, a rear and a longitudinal axis extending from front to rear, said top comprising:
a molded, one-piece, U-shaped frame member having a front section extending transversely of said longitudinal axis and two elongated spaced side sections extending rearwardly from said front section;
each of said side sections having a first receiving fulcrum and a first connecting element;
a pair of molded one-piece side members;
each of said side members having a second receiving fulcrum and a second connecting element;
first pivot means pivotally connecting said first connecting element and said second connecting element to thereby pivotally connect said side sections of said molded one-piece U-shaped frame member to said molded one-piece side member;
a pair of molded one-piece main columns;

second pivot means pivotally connecting said molded one-piece main columns and said second receiving fulcrum to thereby pivotably connect said molded one-piece main column to said molded one-piece side member;

a main bearing support mounted on said vehicle, said main bearing support having a fourth receiving fulcrum and a fifth receiving fulcrum;

third pivot means pivotally connecting said molded one-piece main columns to said fourth receiving fulcrum to thereby pivotably connect said molded one-piece main columns to said main bearing support;

a first guide rod;

a fourth pivot means pivotally connecting said first guide rod to said first receiving fulcrum to thereby pivotably connect said first guide rod to said side sections of said molded one-piece U-shaped frame member;

fifth pivot means pivotally connecting said first guide rod to said molded one-piece main columns to thereby pivotably connect said first guide rod to said molded one-piece main columns;

a second guide rod;

sixth pivot means pivotally connecting said second guide rod to said fifth receiving fulcrum to thereby pivotably connect said second guide rod to said main bearing support; and seventh pivot means pivotally connecting said second guide rod to a third receiving fulcrum to thereby pivotably connect said second guide rod to said molded one-piece side member.

22. A top for a convertible vehicle according to claim 21 wherein said first receiving fulcrum on said side sections of said molded one-piece U-shaped frame member comprises a projection projecting upwardly from said side sections, said projections being integral with said side sections of said molded one-piece U-shaped frame member.

23. A top for a convertible vehicle according to claim 21 wherein said first connecting element on said side sections of said molded one-piece U-shaped frame member part comprises a projection projecting upwardly from said side sections, said projections being integral with said side sections of said molded one-piece U-shaped frame member.

24. A top for a convertible vehicle according to claim 21 wherein said first connecting element on said side sections of said molded one-piece U-shaped frame member comprises a projection projecting upwardly from said elongated side section, said elongated side section and said projection being integral with said molded one-piece U-shaped frame member, said projection having an outer end portion, said first pivot means being located at said outer end portion of said projection.

25. A top for a convertible vehicle according to claim 21 wherein said second connecting element on said side members comprise a projection projecting upwardly from said side members, said side members and said projection each being an integral part of said molded one-piece side member, said projection having an outer end portion, said first pivot means being located at said outer end portion of said projection.

26. A top for a convertible vehicle according to claim 21 further comprising a sixth receiving fulcrum on each of said side sections of said molded one-piece U-shaped frame member, said sixth receiving fulcrum including a projection projecting upwardly from said side sections, said side sections and said projection having an outer end portion, said sixth receiving fulcrum having eighth pivot means at said outer end of said projection, and a roof arch pivotally connected at said eight pivotal means.

27. A top for a convertible vehicle according to claim 21 wherein said first connecting element on each of said side sections comprises a first projection projecting upwardly from said elongated side sections, said first projection being an integral part of said molded one-piece U-shaped supporting member, said first projection having a first outer end portion, said first pivot means being located at said first outer end portion of said first projection, said first receiving fulcrum comprising a second projection projecting upwardly from said elongated side sections, said elongated side section and said second projection each being integral parts of said molded one-piece U-shaped frame member, said second projection having a second outer end portion, said fourth pivot means being located on said second outer end portion of said second projection.

28. A top for a convertible vehicle according to claim 21 wherein said molded one-piece main columns each have an elongate first part and a second part extending laterally from said first part, said first part and said second part being integral parts of said molded one-piece main columns.

29. A top for a convertible vehicle according to claim 21 further comprising a roof arch, and connecting means fixedly connecting said roof arch on said main columns.

30. A top for a convertible vehicle according to claim 21 wherein at least one of said molded one-piece U-shaped frame member, said molded one-piece side members and said molded one-piece main columns are molded from a material selected from the group consisting of diecast aluminum, magnesium alloy, fiber-reinforced plastic, and plastic.

31. A top for a convertible vehicle according to claim 21 wherein each of said molded one-piece U-shaped frame member, said molded one-piece side members and said molded one-piece main columns are molded from a material selected from the group consisting of diecast aluminum, magnesium alloy, fiber-reinforced plastic and plastic.

* * * * *